(12) United States Patent
Witter (10) Patent No.: US 8,393,050 B2
(45) Date of Patent: Mar. 12, 2013

(54) PORTABLE CYCLONIC DUST COLLECTOR/VACUUM CLEANER

(76) Inventor: Robert M. Witter, Syracuse, NY (US)

(*) Notice: Subject to any disclaimer, the term of this patent is extended or adjusted under 35 U.S.C. 154(b) by 664 days.

(21) Appl. No.: 12/607,122

(22) Filed: Oct. 28, 2009

(65) Prior Publication Data

US 2011/0094052 A1 Apr. 28, 2011

(51) Int. Cl.
*A47L 9/10* (2006.01)
*A47L 9/20* (2006.01)
*B01D 50/00* (2006.01)
*B01D 59/50* (2006.01)
*B01D 9/00* (2006.01)
*B01D 39/00* (2006.01)
*B01D 41/00* (2006.01)
*B01D 45/00* (2006.01)
*B01D 47/00* (2006.01)
*B01D 49/00* (2006.01)
*B01D 51/00* (2006.01)
*B01D 53/00* (2006.01)
*B01D 57/00* (2006.01)
*B01D 59/00* (2006.01)

(52) U.S. Cl. ............ 15/353; 55/337; 55/356; 55/DIG. 3

(58) Field of Classification Search .............. 15/347, 15/346, 348, 349, 353, 350, 352, 336, 327.5, 15/323, 320; 55/337, 331, 336, 343, 383, 55/459.1, 302, 304, DIG. 13, DIG. 21, 345, 55/428, 346, 424, 429, 350.1, 356, DIG. 3; 210/304, 295, 323.1, 323.2, 453, 512.1, 787

See application file for complete search history.

(56) References Cited

U.S. PATENT DOCUMENTS

| | | | | | |
|---|---|---|---|---|---|
| 1,884,865 | A | * | 10/1932 | Replogle | 15/336 |
| 3,286,446 | A | * | 11/1966 | Happe et al. | 55/357 |
| 3,822,533 | A | * | 7/1974 | Oranje | 55/394 |
| 3,870,486 | A | * | 3/1975 | Eriksson et al. | 96/385 |
| 3,964,888 | A | * | 6/1976 | Hahner et al. | 96/382 |
| 4,581,050 | A | * | 4/1986 | Krantz | 55/315.2 |
| 4,650,200 | A | * | 3/1987 | Berfield et al. | 280/47.26 |
| 4,853,008 | A | * | 8/1989 | Dyson | 55/345 |
| 5,062,870 | A | * | 11/1991 | Dyson | 96/400 |
| 5,066,315 | A | * | 11/1991 | Haberl et al. | 95/271 |
| 5,089,037 | A | * | 2/1992 | Marsolais | 55/357 |
| 5,163,985 | A | * | 11/1992 | Chen | 55/356 |
| 5,513,416 | A | * | 5/1996 | Bassler et al. | 15/323 |
| 5,746,795 | A | * | 5/1998 | Witter | 55/472 |
| 6,171,356 | B1 | * | 1/2001 | Twerdun | 55/337 |
| 6,251,296 | B1 | * | 6/2001 | Conrad et al. | 210/806 |
| 6,641,646 | B2 | * | 11/2003 | Rosenberg | 95/280 |
| 6,868,578 | B1 | * | 3/2005 | Kasper et al. | 15/347 |
| 6,887,290 | B2 | * | 5/2005 | Strauser et al. | 55/283 |

(Continued)

*Primary Examiner* — Todd Manahan
*Assistant Examiner* — Vanitha Elgart
(74) *Attorney, Agent, or Firm* — Bernhard P. Molldrem, Jr.

(57) ABSTRACT

A cyclonic portable vacuum cleaner/dust collector for workshop or other use has a conic body that is supported on a hand cart or dolly. A funnel shaped divider plate within the conic body divides it into a cyclonic chamber between the divider plate and the lower nose, and a filter chamber between the divider plate and a motor plate that closes the upper mouth of the conic body. The filter chamber contains a filter cartridge. A vacuum air pump is mounted on the motor plate, and is covered by a shroud or housing. Clean, filtered air is exhausted into the ambient. Process dust settled into a dust collection drum supported beneath the nose of the conic body. A pulse cleaning arrangement serves for periodic filter cleaning. The supporting cart can be wheeled or can use a wall bracket for wall mounting.

15 Claims, 8 Drawing Sheets

U.S. PATENT DOCUMENTS

| | | | |
|---|---|---|---|
| 7,217,307 B2 * | 5/2007 | Cheng | 55/356 |
| 7,247,180 B1 * | 7/2007 | Hill | 55/315 |
| 7,282,074 B1 * | 10/2007 | Witter | 55/300 |
| 7,449,040 B2 * | 11/2008 | Conrad et al. | 55/426 |
| 7,550,021 B2 * | 6/2009 | Witter | 55/295 |
| 7,695,538 B2 * | 4/2010 | Cheng | 55/467 |
| 7,776,120 B2 * | 8/2010 | Conrad | 55/426 |
| 7,785,381 B2 * | 8/2010 | Oh et al. | 55/300 |
| 7,824,457 B2 * | 11/2010 | Witter | 55/337 |
| D630,391 S * | 1/2011 | Cheng | D32/21 |
| 8,012,225 B2 * | 9/2011 | Pineschi | 55/298 |
| 8,147,580 B2 * | 4/2012 | Lin | 55/429 |
| 8,161,597 B2 * | 4/2012 | Witter et al. | 15/347 |
| 2004/0098827 A1 * | 5/2004 | Oh et al. | 15/347 |
| 2004/0107529 A1 * | 6/2004 | Shahbaz | 15/327.5 |
| 2008/0016830 A1 * | 1/2008 | Witter | 55/337 |
| 2009/0031525 A1 * | 2/2009 | Makarov et al. | 15/347 |
| 2009/0307866 A1 * | 12/2009 | Witter et al. | 15/353 |
| 2011/0107547 A1 * | 5/2011 | Liu | 15/323 |
| 2011/0203237 A1 * | 8/2011 | Witter et al. | 55/337 |
| 2012/0047681 A1 * | 3/2012 | Charlton et al. | 15/347 |

* cited by examiner

PORTABLE CYCLONIC DUST COLLECTOR/VACUUM CLEANER

BACKGROUND OF THE INVENTION

This invention is directed to heavy-duty vacuum cleaners of the type intended for workshop use, such as in wood shops, machine shops, or for industrial applications, namely, a hybrid shop vacuum/dust collector, having a higher capacity (more CFM) than a standard shop vacuum. The invention is more particularly concerned with a heavy duty portable vacuum in which there are a two or more dust separation stages, with the large majority of the dust being separated cyclonically and deposited into a drum or barrel, and with the remaining dust that is carried in the vacuum machine air stream being filtered out in a final filter, so that the vacuum cleaner machine exhausts clean, filtered air into the ambient.

Industrial vacuum cleaners and shop vacuum cleaners are often employed for picking up dust that has accumulated on the shop floor and on surfaces of equipment, or may also be connected to a dust outlet of a dust-producing tool, i.e., wood working machines, such as sanders, joiners, and the like, or machines that process metals, plastics, or other composites such as concrete or stone. In these industrial vacuum devices, there is typically a vacuum head and a drum or barrel. The vacuum head has a blower that is powered by an electric motor to induce a suction to draw a stream of air into the machine. The airstream is then directed into the barrel, where dust collects. From there, the air stream passes though a bag filter or other filter, and is exhausted to the ambient.

In most cases, the vacuum filter does not filter out fine dust, and there is always at least some of the dust that passes out and back into the ambient air. This airborne fine dust can present a health hazard, and in a wood shop environment airborne particulates constitute a serious quality issue as the airborne dust can contaminate varnish or other wood finishes.

The dust that is collected can quickly clog and blind the filter also, which limits air flow and diminishes the efficiency of the vacuum cleaner. Moreover, filling of the filter material requires that the vacuuming operation be interrupted frequently for cleaning and/or replacing of the filter.

A shop-type vacuum cleaner with a cartridge type final filter to capture fine dust particles has been proposed previously, and an example of such a shop vacuum is described in U.S. Pat. No. 5,069,696. In that case, an externally-mounted filter is located in the exhaust air stream in a housing that is disposed outside the vacuum machine drum or canister. This arrangement exhausts significantly cleaner air back into the ambient, but because the air passes directly from the main collection drum out to the filter housing, the filter accumulates dust quickly and requires frequent cleaning for effective operation.

It has been proposed previously to employ a cyclonic separator in line in a vacuum hose in advance of a shop vacuum cleaner for pre-separating particulate matter, and then with the outlet pipe of the cyclonic separator connecting to the inlet of the vacuum cleaner. This arrangement is described, for example, in U.S. Pat. No. 7,282,074. This system can result in removal of about ninety percent, or more, of the dust from the air stream ahead of the vacuum cleaner, so that the vacuum cleaner operates longer and more efficiently in most applications. However, this arrangement requires attaching the cyclone as a separate element in between the shop vacuum cleaner and the dust producing tool or dust pick-up tool.

OBJECTS AND SUMMARY OF THE INVENTION

Accordingly, it is an object of this invention to create a combined vacuum and a high energy efficiency cyclonic separator so that the device has an efficient but simplified design, and avoids the drawbacks of the prior art.

It is a more specific object to provide a vacuum cleaner which efficiently removes nearly all of the dust from the vacuum air stream, and returns clean, filtered air to the ambient.

It is a further object of this invention to provide a vacuum cleaner which can operate for an extended period without need to unclog or clean the exhaust air filter.

An important object is to provide a powerful and heavy-duty vacuum cleaning machine that is light-weight and portable, and can be easily wheeled into place.

Another object is to provide a vacuum cleaner having a final filter and a pulse cleaning feature that allows the user to produce a reverse pulse of air flow to drive dust off the final filter.

According to an aspect of the invention, a heavy duty portable industrial vacuum cleaner has a conic body that is generally defined by a conic wall or shell. An upper plate closes off a wide upper end of the conic wall, and a narrow nose, situated at a lower end of the conic wall, serves as dust outlet. The upper plate has a central air passage. A divider plate is affixed within the conic body at a level that is about midway between the lower end and the upper end of the conic body. This divider plate defines a cyclonic chamber beneath the divider plate, i.e., between the divider plate and the nose of the conic body, and defines a filter chamber above the divider plate, i.e., between the divider plate and the upper plate. The divider plate can have a shallow conic shape, i.e., concave shape sloping towards a central passage, with a vortex tube descending from the central passage into the cyclonic chamber. The conic divider plate is adapted to return dust pulsed from the filter to the dust collection drum.

An air inlet conduit penetrates the conic wall just below the divider plate and is adapted to introduce into the cyclonic chamber a flow of air in which dust particles are entrained. The air inlet conduit is adapted to attach to a flexible vacuum hose, with the hose being connected to a dust pickup tool, or to dust generating equipment such as a saw, joiner, sander, etc.

A dust collection drum, i.e., a canister, is positioned below the nose of the conic body, and has a lid that closes off the top or mouth of the dust collection drum. The lid has a dust inlet opening. A boot or collar, that is, a dust conduit, is coupled between the nose of the conic body and the inlet opening of the lid. Dust that is separated in the cyclonic chamber from the air flow drops from the nose, through the conduit, into the dust collection drum. The conduit should form a generally airtight dust seal with both the nose and the lid to preclude leakage of external air into the cyclonic chamber and/or into the drum.

A final filter, e.g., a generally cylindrical cartridge filter, which may be a HEPA filter, is mounted on the lower side of the upper plate, at the center so as to cover the air passage. The filter is thus suspended within the filter chamber, and is adapted to filter the air that leaves the vortex tube and enters the filter chamber from the central passage of said divide plate. This air is filtered before the air leaves through the central air passage of the upper plate. The final filter cartridge is sealably disposed against an under side of the upper plate and surrounds the air passage.

A vacuum blower is supported upon the upper plate. The blower has an inlet opening that communicates with the central air passage in the upper plate. Favorably, the blower is covered with a generally cylindrical shroud, which may have a lining of a sound absorptive material. This material may be porous to air, at least at the top, to permit the air to exhaust without much resistance to the ambient. To facilitate portability, the machine has a wheeled carriage, which includes a frame on which the dust collection drum and the conic body are supported, and wheel members at the base of the frame. Alternatively, the unit may be wall-mounted, using a suitable wall bracket.

Favorably, there is a mounting ring disposed at the top end of the conic body affixed just inside the upper rim, i.e., at an inner periphery of the wide upper end of the conic wall, with the upper plate resting atop the mounting ring. An annular gasket or similar seal or gland is disposed between the mounting ring and a periphery of said upper plate.

A series of clamps are disposed around the periphery of the wide upper end of the conic wall for releasably clamping the upper plate against the mounting ring with the gasket compressed between them. The clamps can release the upper plate, which can be lifted out to change the filter cartridge, when needed.

The vacuum blower is mounted so that its rotary axis is vertical. The inlet conduit for the blower is disposed on the rotary axis and is positioned on the machine axis, i.e., the axis of the conic body, so that the inlet conduit extends through the air passage of the upper plate.

As aforesaid the top cover or shroud contains the vacuum blower, and has a number of vent openings to permit exhaust air from the blower to escape to the ambient. The shroud can be in the form of a generally cylindrical housing, with the layer of a sound absorbent material disposed on an interior wall of the housing.

The frame of the carriage or truck has a horizontal base portion on which the dust drum or canister is supported. There are a pair of generally vertical rails rising from base member and these extend upward alongside the conic body. Each rail has a respective strut that extends towards the conic body, and there are a pair of brace members each associated with a respective one of the struts. Each of the brace members is affixed at one end to an upper part of the conic body, and is also attached to the respective one of said struts. The connection of the strut and brace member can allow some pivoting, to facilitate changing out the dust collection drum.

In some embodiments, a spring-loaded plug member is seated in an opening in the upper plate, near its central air passage. This can be unseated by pulling or pushing on a handle outside the shroud. This feature is used to create a reverse air pulse to drive accumulated dust off the filter assembly. The dust then lands on the concave, funnel-shaped divider plate, and works its way down into the vortex tube, and continues down into the dust collection drum.

In an alternative embodiment, the plug member can be one or more flaps which include a permanent magnet to bias the flap closed over the hole in the upper plate. In that case, the hole(s) do not need to be round. These flaps are mounted on a rotatable rod, which can be twisted to an open position by a handle outside the unit. When released, the magnet or magnets close the flaps down onto the holes or openings. This may optionally employ a spring to bias the flaps closed.

Favorably, the dust conduit between the nose of the conic body and the dust collection drum is formed as a flexible tubular collar. This collar may have a lower portion supported on the lid of the dust barrel, and has an upper end fitted onto the nose of the conic body.

In practice, the dust collection drum receives the vast majority of the dust (typically, 99%+) from the vacuum cleaner air stream. The filter cartridge only deals with the very fine dust that is not separated out in the cyclonic chamber.

In operation, an air stream containing entrained dust passes from a flexible intake hose and through the intake conduit into the cyclonic separator that is formed at the lower part of the conic body; the vast majority of the dust is separated out here and drops into the dust collection drum. Then, the air stream exits upwards through the vortex tube into the filter chamber just above it in the upper part of the conic body. The majority of the remaining fine dust particles are caught in the final filter cartridge. The air flow continues through the final filter cartridge (HEPA) and through the central air passage of the upper plate, into the intake duct of the vacuum blower. The vacuum blower exhausts clean, filtered air into the ambient.

The dust collection drum can include a hold-down feature for securing a flexible film bag liner within the drum. Such a hold-down feature can include a vacuum conduit penetrating a lower portion of the drum.

Periodically, the user can knock the dust from the intake side of the cartridge filter. In the embodiments of this invention, this is done using the reverse pulse feature mentioned above. With the vacuum cleaner running, the user removes the intake hose and blocks the intake conduit with his or her hand. Then, the user pushes, pulls, or twists the actuator handle, and pulls or rotates the plug member, or flap, off its seat. This allows ambient air to fill the zone that is radially inward of the filter cartridge material. The air outside the filter material remains at a very reduced pressure, and the result is that a reverse air flow blasts the dust particles off the outer side of the filter cartridge. The dust particles fall to the divider plate, and then pass down through the vortex tube to the tip or nose of the cone, and then into the dust collection drum. Releasing the handle allows the plug (or flap) to be reseated by spring action, magnetic force or other restoring force.

The industrial vacuum cleaner arrangement of this invention can operate continuously for long periods without interruption, as 95 to 99+ percent of the collected dust is separated out by the cyclonic separator portion and is deposited into the dust collection drum. The machine of this invention has an advantage of increased fire safety, as the dust, which may present a danger of flame or explosion, is blocked from re-entering the ambient air. Industrial hygiene is vastly improved, as well, as dust and particulates (which may be toxic or carcinogenic) are kept out of the breathing air.

The above and many other objects, features, and advantages of this invention will become apparent from the ensuing detailed description of one preferred embodiment, which is illustrated in the accompanying Drawing.

DETAILED DESCRIPTION OF A PREFERRED EMBODIMENT

Figure 1:
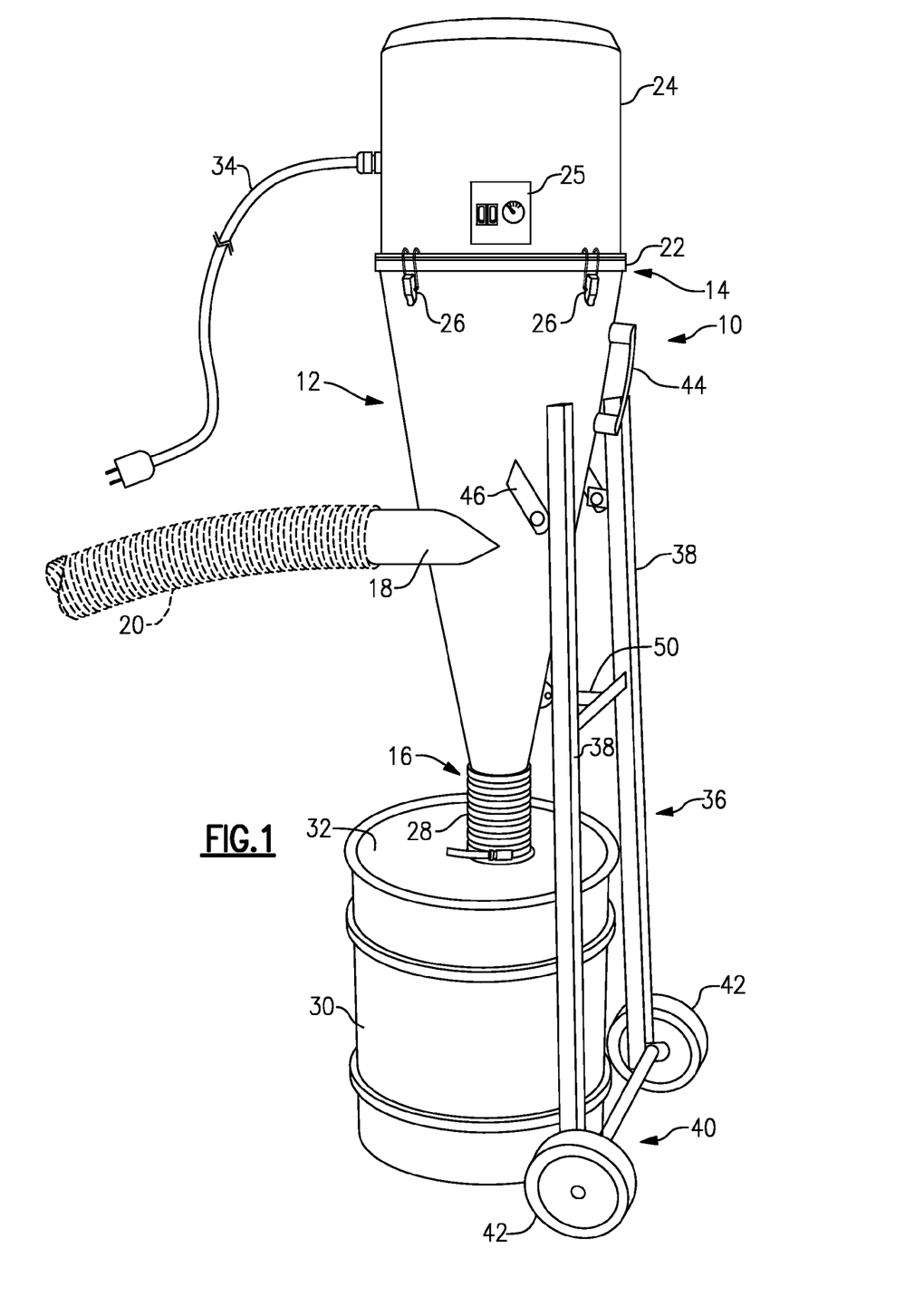
FIG. 1 is a perspective system view of a portable cyclonic vacuum cleaner device according to one embodiment of this invention.
Figure 2:
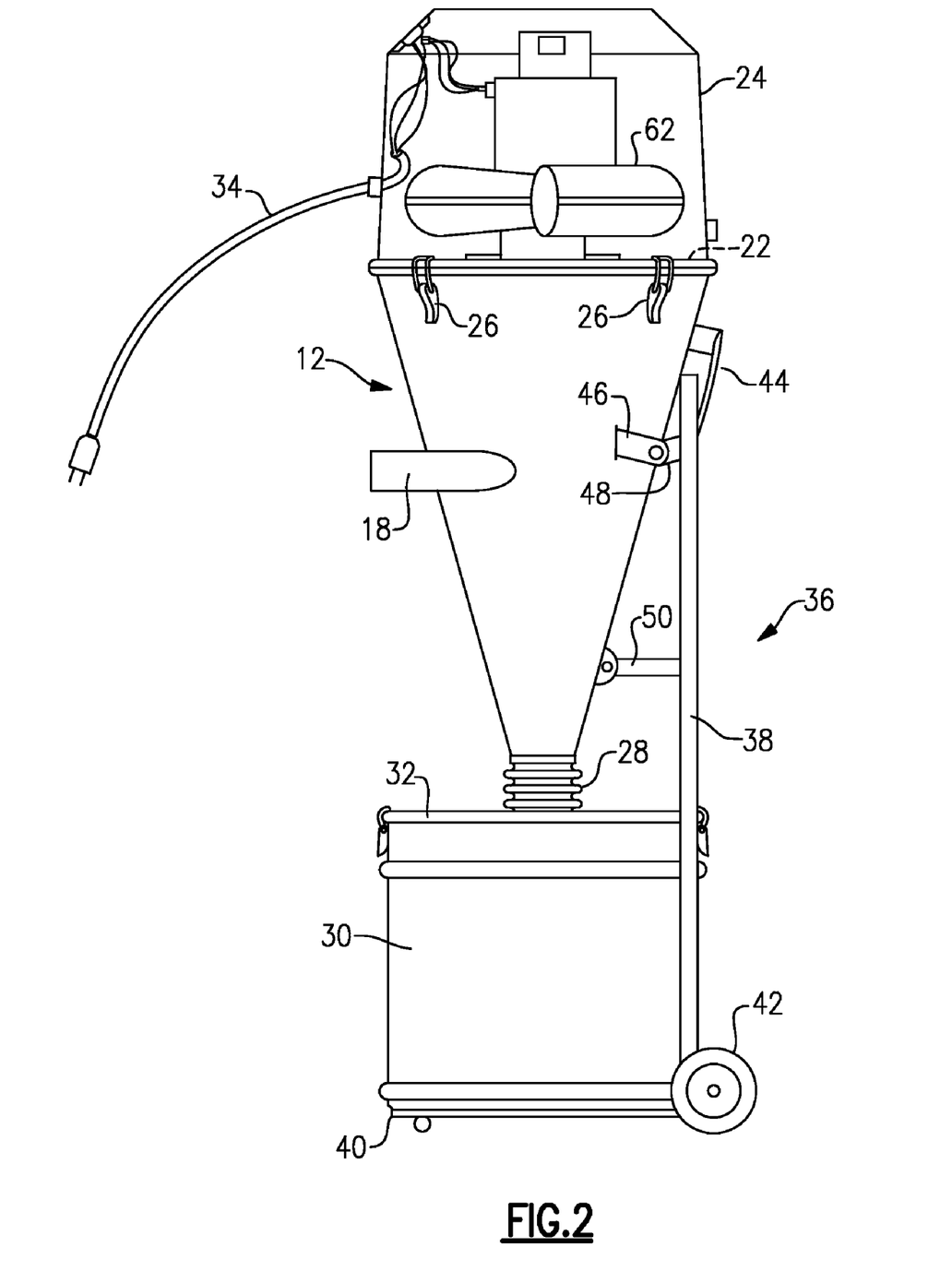
FIG. 2 is a side elevation thereof, with an upper shroud thereof shown in broken line.
Figure 3:
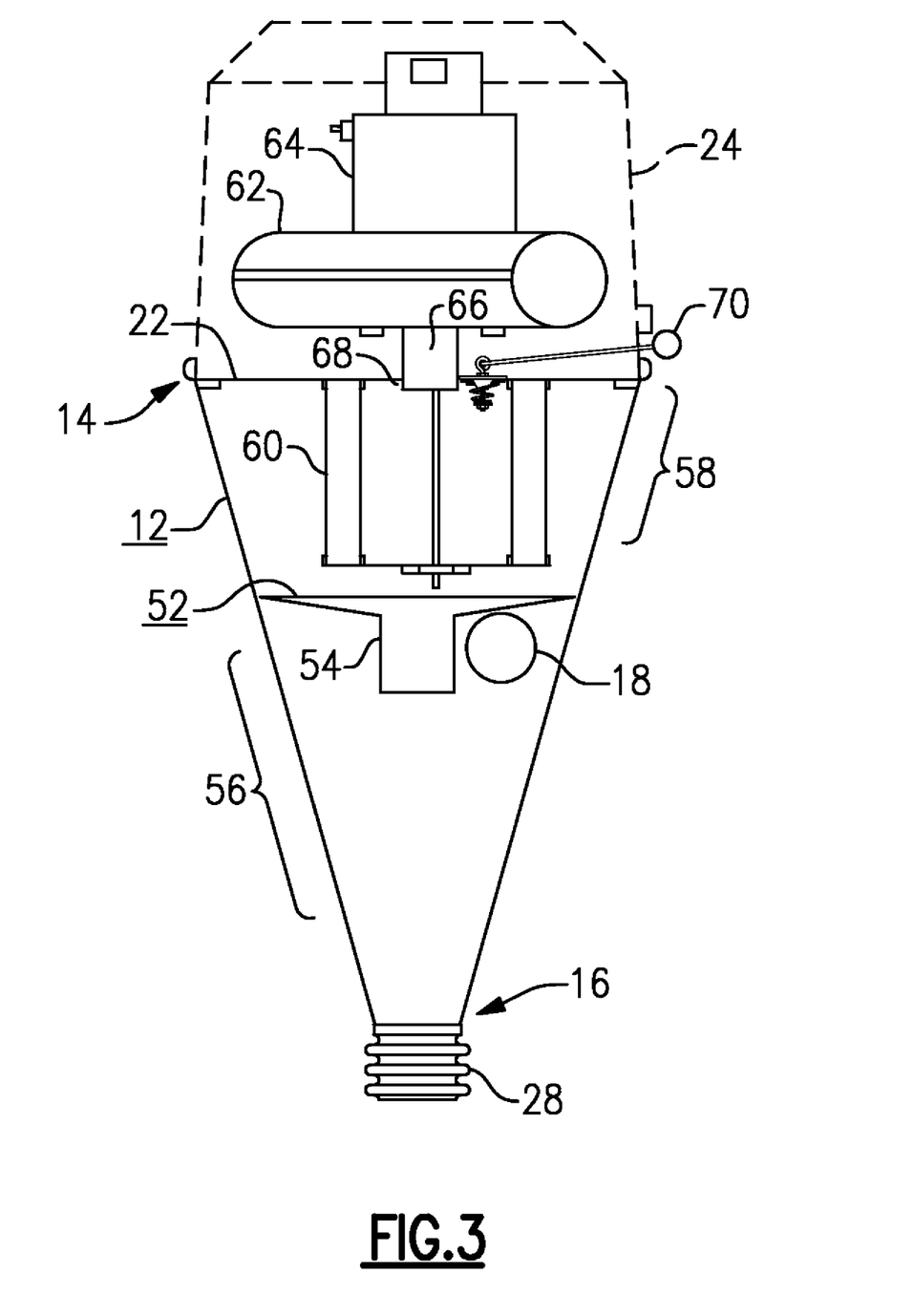
FIG. 3 is a schematic front elevation thereof.

Now, with reference to the Drawing, FIGS. 1 to 3 show the portable cyclonic vacuum cleaner 10 according to an embodiment of this invention in which dust is cyclonically separated from the air flow, with the leaving air being cleaned in final filter and returned to the ambient as clean, filtered air.

The cyclonic vacuum cleaner 10 is based on conic body 12, that is, a cone-shaped shell with a mouth 14 or wide end at its top and a narrow nose 16 at its bottom end. An intake pipe 18 or air inlet penetrates the conic body 12 at a point about half-way between the mouth and the nose, and a flexible vacuum hose 20, here shown in broken line, is attached to the intake pipe 18. The hose 20 can be connected to a scoop or other vacuum cleaner tool, or may be connected to a dust producing tool or appliance, such as a sander or saw. In this embodiment, the hose 20 and intake pipe 18 have a nominal 2.5 inch diameter. The intake pipe or inlet 18 can be shouldered and tapered to allow it to accommodate a wide range of standard hose diameters.

A flat, circular motor plate 22 is positioned at the top end or mouth 14 of the conic body, and an upper shroud 24, i.e., cover in the form of an inverted metal or synthetic pot is fastened onto the conic body 12 and motor plate 22 by means of a number of clamps 26, which here are shown as releasable latches. An instrument panel 25 is located on one side of the shroud 24, where are positioned an on-off switch, a filter pressure cleaning gauge, and other gauges and controls, as needed.

A round-profile plastic tubular boot 28 connects over the nose 16 of the conic body 12, and this leads to a dust collection drum 30 or barrel located just below the conic body. The drum 30 or barrel has a lid 32, which is held closed to the drum by clamps, and the boot 28 attaches to a fitting at the center of the lid 32. An annular seal or gasket (not shown) may be employed between the lid and the rim of the drum to block air leakage into the drum during operation. Also, a plastic film bag liner (not shown) may be used, to facilitate emptying and disposing of the collected dust.

A power cord 34 leads to the cylindrical side wall of the shroud 24, and from there to the power air handling equipment beneath the shroud, which will be discussed shortly.

The conic body and dust collection drum are mounted on a wheeled hand truck or dolly 36, which is in the form of a frame. There are a pair of upright members 38 and 38, shown to the right of the drum and conic body in FIGS. 1 and 2, and a generally horizontal base 40 at the lower part of the frame, which supports the bottom of the dust collection drum 30. A pair of wheels 42 of a nominal ten-inch diameter are mounted on an axle disposed at the base and lower part of the frame. The ten-inch wheels facilitate pulling the unit up stairs.

In this embodiment, there is a handle 44 attached directly onto the upper part of the conic body 12 at or near the top ends of the uprights 38.

A pair of gussets 46 are welded onto the conic wall of the conic body 12, and a corresponding pair of arms 48 are shown extending from the respective upright members 38. The arms 48 are each bolted to the associated one of the gussets 46. Also, there is a lower brace 50, shown in FIG. 2, that extends horizontally from a lower portion of the conic body and is joined to structure on the two upright members 38. Of course, the frame of the hand truck or dolly 36 can take many other forms and still serve the same function of support and portability.

Now with reference to FIG. 3, inside the conic body 12 a divider plate 52 is positioned just above the point where the intake pipe 18 penetrates. The plate 52 is in the form of a disk, or in this embodiment, a shallow cone, with a vortex tube 54 at its center, which extends downward. The divider plate is welded to the inner surface of the conic body at this level. The shallow cone shape of plate 52 allows dust to be guided back to the drum following pulse filter cleaning. The welding may be accomplished with spot welding or by welding short segments, in which case a caulk or sealing material can be applied to the circumference of the plate to seal off any openings.

The divider plate 52 serves to divide the conic body into upper and lower portions, with the lower portion between the divider plate and the nose 16 being defined as a cyclone chamber, and with the upper portion between the divider plate 52 and the mouth 14 (and motor plate 22) being defined as a filter chamber 58.

A final filter 60, here in the form of a cylindrical filter cartridge, is shown attached to an under side of the motor plate 22 within the filter chamber 58.

As also shown in FIG. 3, beneath the shroud 24 (shown here in broken line) is a centrifugal air pump 62, with an associated electric motor 64. Electrical power wiring is omitted in this view. The air pump 62 has an intake located here at its vertical axis, which is mounted onto the motor plate, and positioned at a central opening 68 of the motor plate 22.

In operation, a stream of air that is picked up by the vacuum tool, with entrained dust particles, travels through the intake vacuum hose 20 and enters through the intake pipe 18 into the cyclonic chamber 56, i.e., the cyclonic separator portion of the unit. The air stream then proceeds around the vortex tube 54 and continues on a downward spiral path towards the lower nose 16 of the cyclone. The dust separates against the side of the cyclone chamber 56, and descends down, out the lower nose and into the dust collection drum 30. The air stream, from which the large majority of dust has been separated, then proceeds up the center of the cyclone, and out the vortex tube 54, through the divider plate 52, and into the filter chamber 58. The air moves up around the outer periphery of the filter 60 and then passes radially inward through the filter media, then passed up through the central opening 68 of the motor plate, and into the intake of the centrifugal pump 62. The air exhausts out the exhaust port of the pump, and diffuses around the interior of the shroud, passing out through openings provided in the upper part of the shroud, back to the ambient. The air exhausted from the unit into the ambient is clean, filtered air, with over 99.97 percent of the dust (down to 0.3 microns) separated from the air stream, where he filter is HEPA rated.

The operator can use this vacuum cleaner for an extended period of time, and does not need to interrupt the operation for the purpose of unclogging or emptying bags or filters. There is improved fire safety as combustible dust particles are entirely filtered out and contained, and are kept from the ambient air. The filter service interval for filter 60 is also very long, and pressure loss through the filter cartridges is also kept low, due to the efficiency of the pre-separation within the cyclone chamber. The filtration of air and separation of dust vastly improves the industrial hygiene for the operators.

Figure 4:
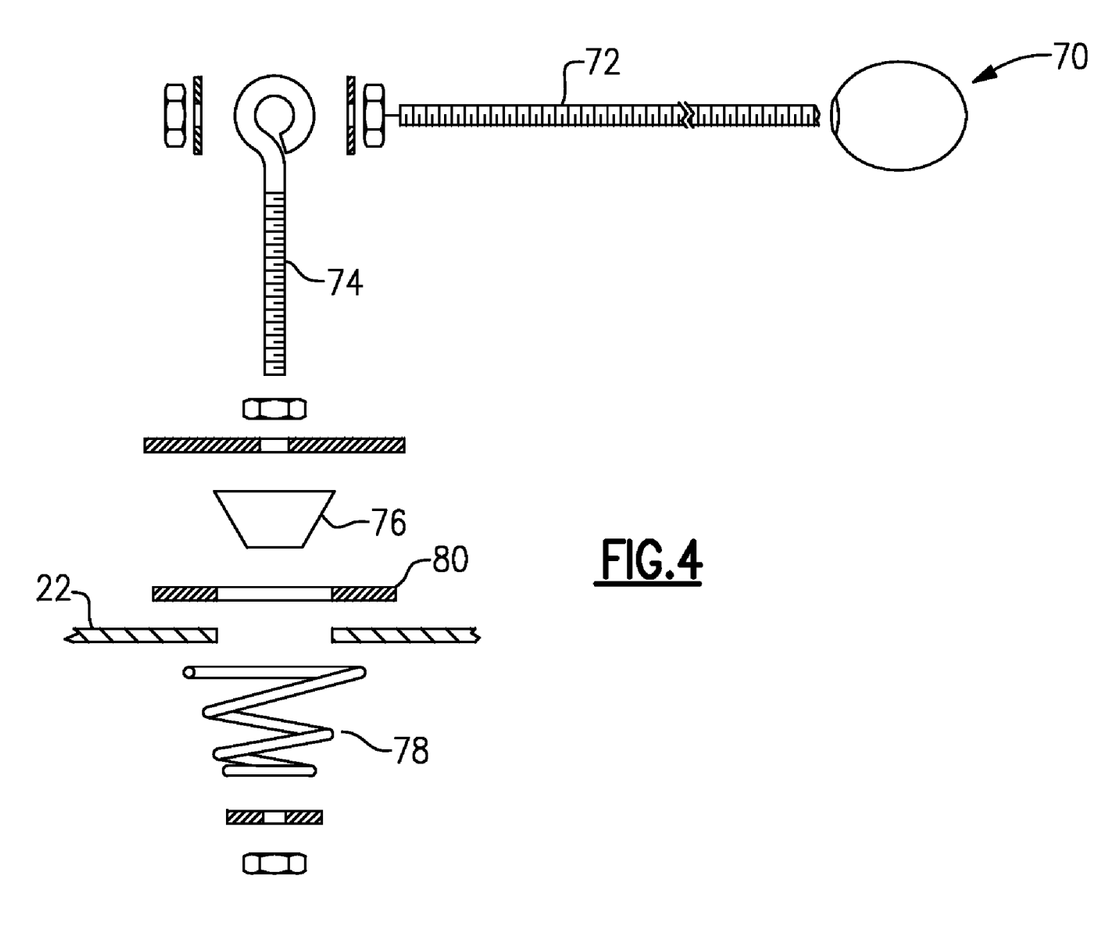
FIG. 4 is an assembly view of a reverse air pulse filter cleaning mechanism employed in an embodiment of the invention.

A filter cleaning mechanism, which here has a pulse button 70 positioned externally of the shroud 24, can have the form as shown in FIG. 4.

The air pulse filter cleaning mechanism can include a (threaded) rod 72 that extends through the side of the shroud with the pulse button or knob 70 at the outer end, and with the inner end connected to an eye bolt 74. A plug member 76, here a generally frustoconic hard rubber element, is positioned on the eye bolt 74 and a coil spring 78 is also positioned over the shaft of the eye bolt, with an annular seat member 80 for the pulse valve being situated between the plug and the spring. The seat member 80 is situated against the motor plate 22, at the position of an opening or penetration therethrough. The penetration is inside the radial extent of the filter cartridge 60.

Figure 5:
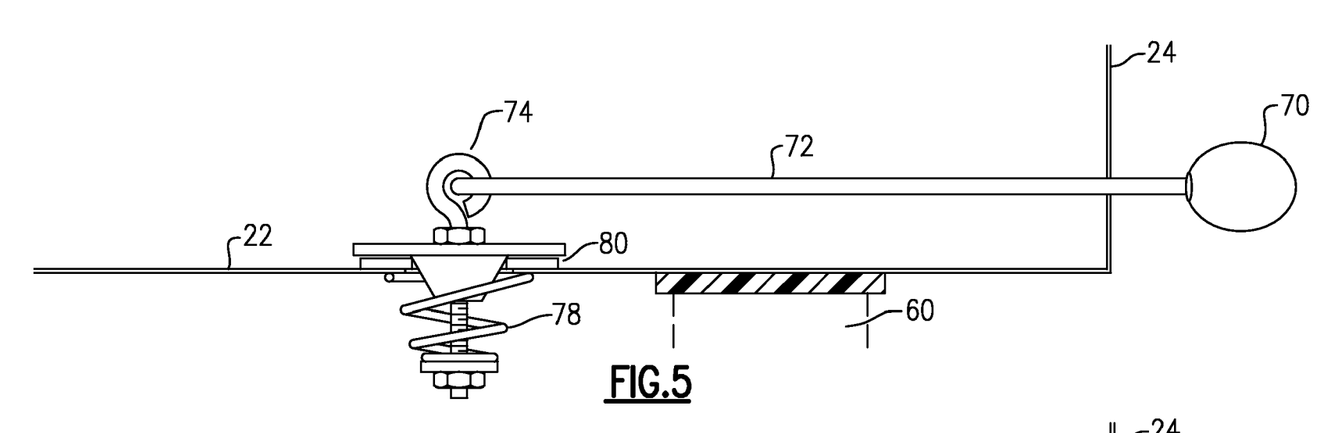
FIGS. 5 and 6 are views used to explain the operation of the reverse air pulse feature of the embodiment of FIG. 4.
Figure 6:
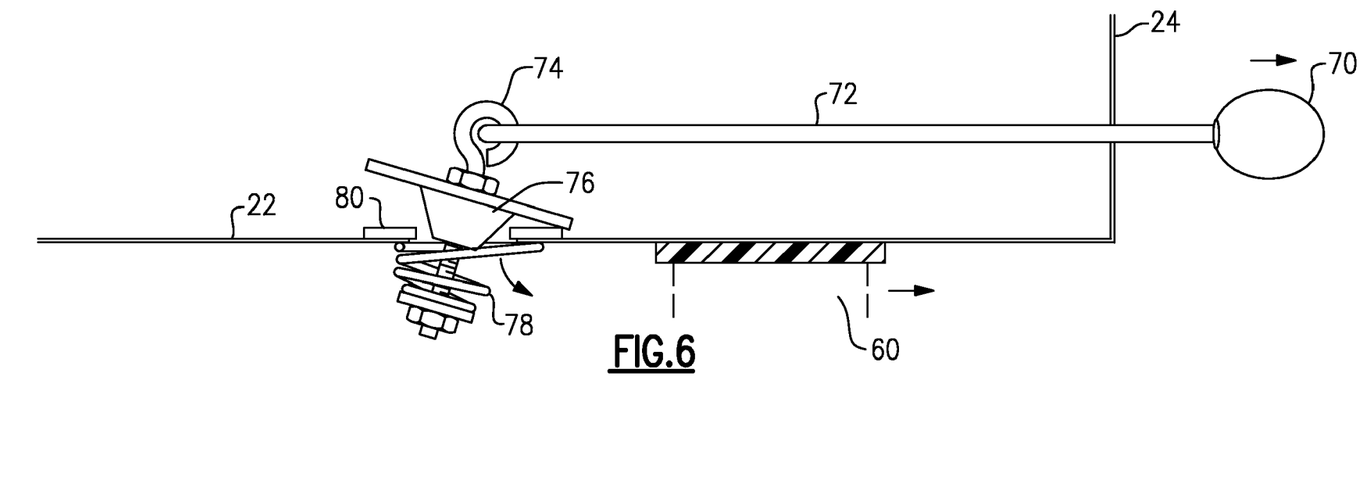

The functioning of this air pulse filter cleaning mechanism can be explained with reference to FIGS. 5 and 6.

After some period of operation, when the operator desires to blast the dust from the cylinder, the operator can remove the hose 20 from the intake pipe 18 and block that with his or her hand. Then the operator can tug once or twice on the knob 70. This action pulls the plug 76 off the seat 80, and allows the higher pressure air above the motor plate 22 to vent into the space within the filter cartridge 60. This produces a pulse of air in the reverse direction, i.e., from inside to outside of the filter medium, and the blasts off any dust particles that have accumulated on the outside surface of the filter medium. The particles fall down, onto the divider plate 52, and because of the conic shape of the divider plate, the particles follow the slope down to the vortex tube 54 and fall from there, through the cyclonic chamber, and into the dust collection drum. When the knob 70 is released, the spring 78 brings the plug back onto the seat, and normal vacuum cleaning operations can be resumed.

Figure 7:
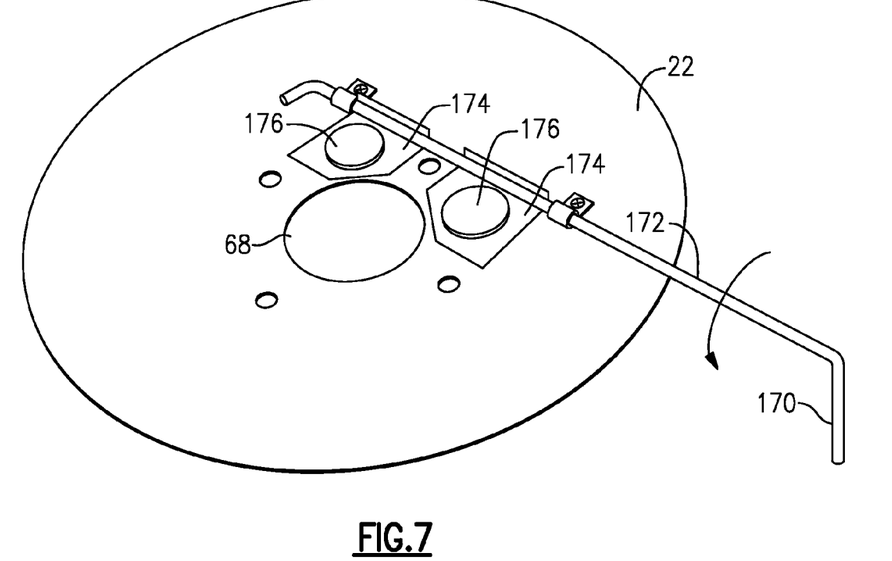
FIGS. 7 and 8 are perspective views to illustrate an alternative magnetic flap reverse air pulse mechanism that may be employed in this invention.
Figure 8:
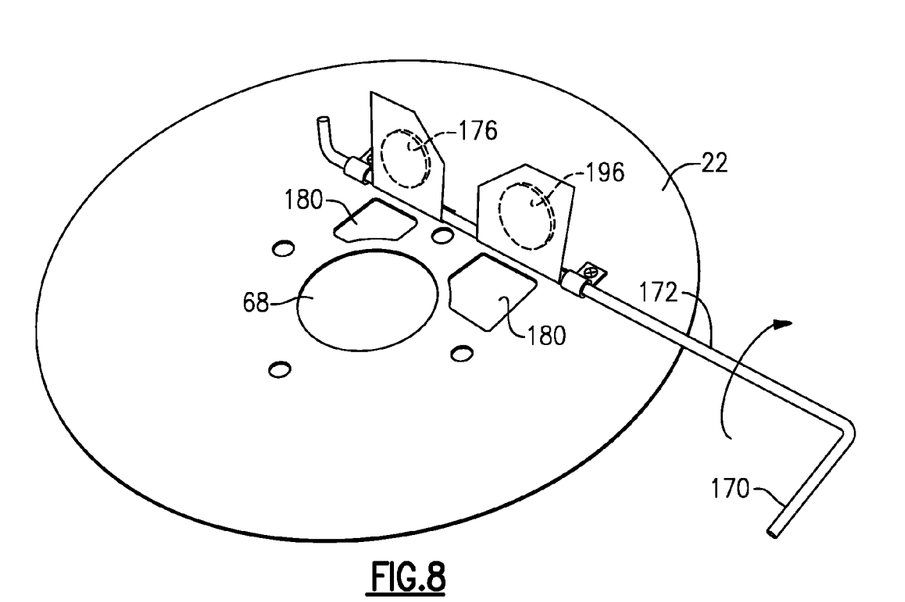

An alternative arrangement of the filter reverse pulse mechanism is shown in FIGS. 7 and 8, and can be employed in embodiments of this invention. Here, the reverse pulse feature is shown to have a twist handle 170 (positioned outside the shroud) and this serves to rotate a shaft 172 that is mounted to pivot on the upper side of the motor plate 22. In these views, the fan 62 and motor 64 are omitted, but the position of the central opening 68 is shown. There are one or more planar flaps 174 that are attached onto the shaft, and these are shaped to cover respective openings 180 situated in the motor plate 22 just outside the extent of the opening 68. These openings 180 do not need to be circular. On each flap 174 there is a permanent magnet 176, so that the flap is normally biased to a closed position against the upper surface of the motor plate. To perform a reverse pulse cleaning of the filter, the hose 20 is removed from the intake 18, as discussed above, and the operator can cover the intake 18 to block the air flow into it. This serves to create a strong vacuum within the conic body, and in particular within the filter chamber 58. Rotating the handle 70 lifts the flaps 174, and higher-pressure air rushes through the openings 180 into the space on the interior of the filter. The air blasts across the filter medium to knock off the surface dust particles, as mentioned before. Then when the handle 170 is released, the force of the magnets 176, as well as the air pressure differential, pushes the flaps 174 back to their closed position. The magnets 176 snap the flaps closed, and hold them securely down. A gasket formed of a resilient sealing material may be applied around the openings 180, but is not shown here.

Figure 9:
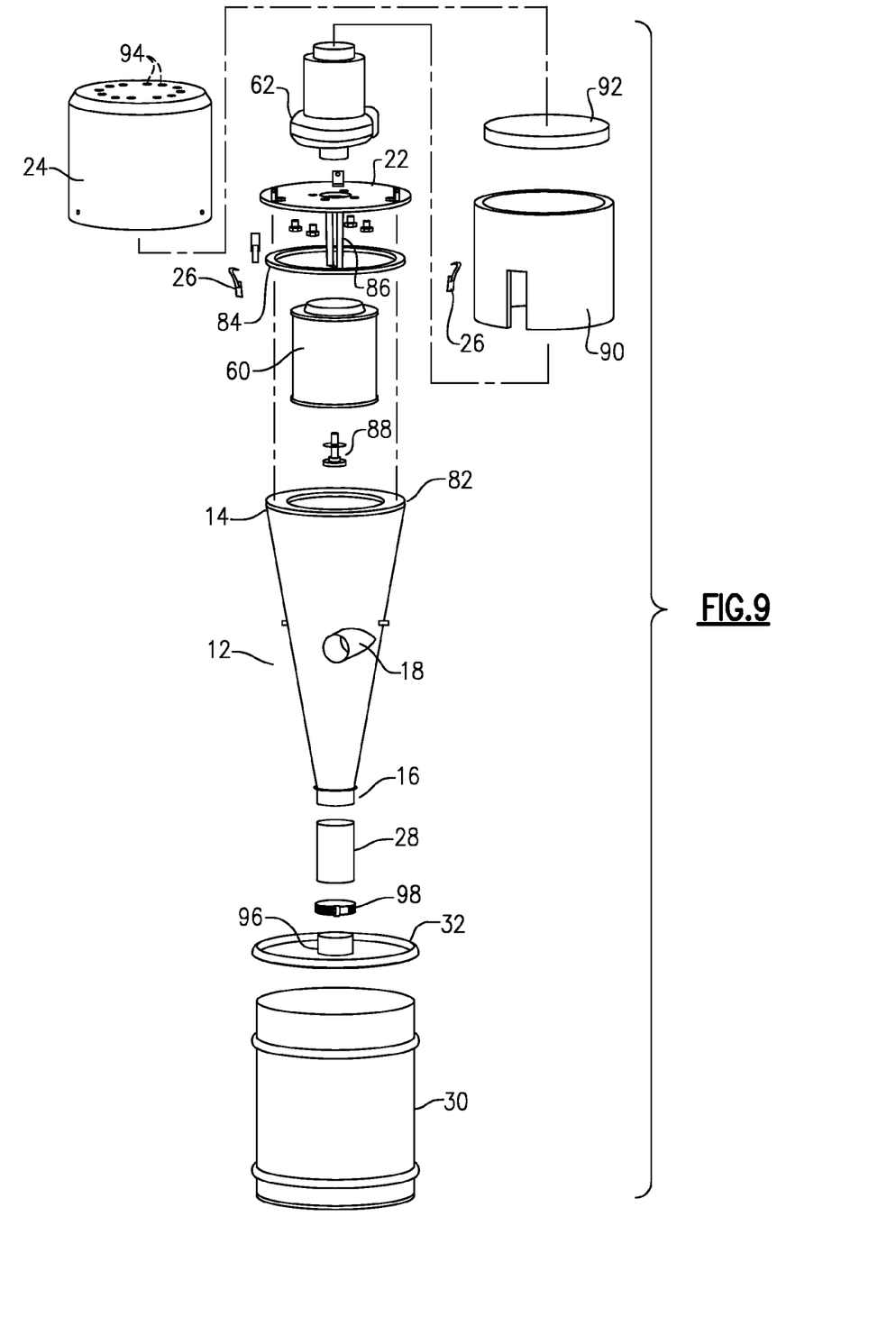
FIG. 9 is an exploded assembly view of this embodiment.

Some details of the construction of the portable cyclonic vacuum cleaner, and the positioning of many of the various parts, are illustrated in the exploded assembly view of FIG. 9. As shown at the upper end of the conic body, there is a mounting ring 82, here a planar ring, that is welded or affixed inside the upper mouth 14. A gasket or sealing ring or gland 84 lays on this mounting ring 82 and forms an air-tight seal between the mounting ring 82 and the periphery of the motor plate 22 so there is no leakage of air around the motor plate into the filter chamber 58. A brace 86 extends down from the motor plate 22 and is employed for holding the filter cartridge 60 against the underside of the motor plate 22. A screw-on retainer 88 fits threads in the brace 86 to hold the filter 60 in place. As also shown here, a foam silencer 90, generally cylindrical in shape, fits against the interior cylindrical side wall of the shroud, and disk-shaped foam silencer pad 92 fits against the underside of the upper flat wall of the shroud 24. These are formed of a material that is effective in absorbing several dB of the noise generated by the air pump 62 and motor 64, giving the vacuum cleaner a relatively quiet operation. The silencer disk 92 is preferably a porous foam material so that the exhaust air leaving the exhaust port of the air pump 62 will exit easily through openings or ports 94 in the upper flat wall of the shroud. Also as shown, in this embodiment the tubular boot 28 fits onto an extension of the conic body at the nose 16, and its lower end fits onto a pipe stub 96 formed on the drum lid 32, where it is held in place with an annular clamp 98.

Figure 10:
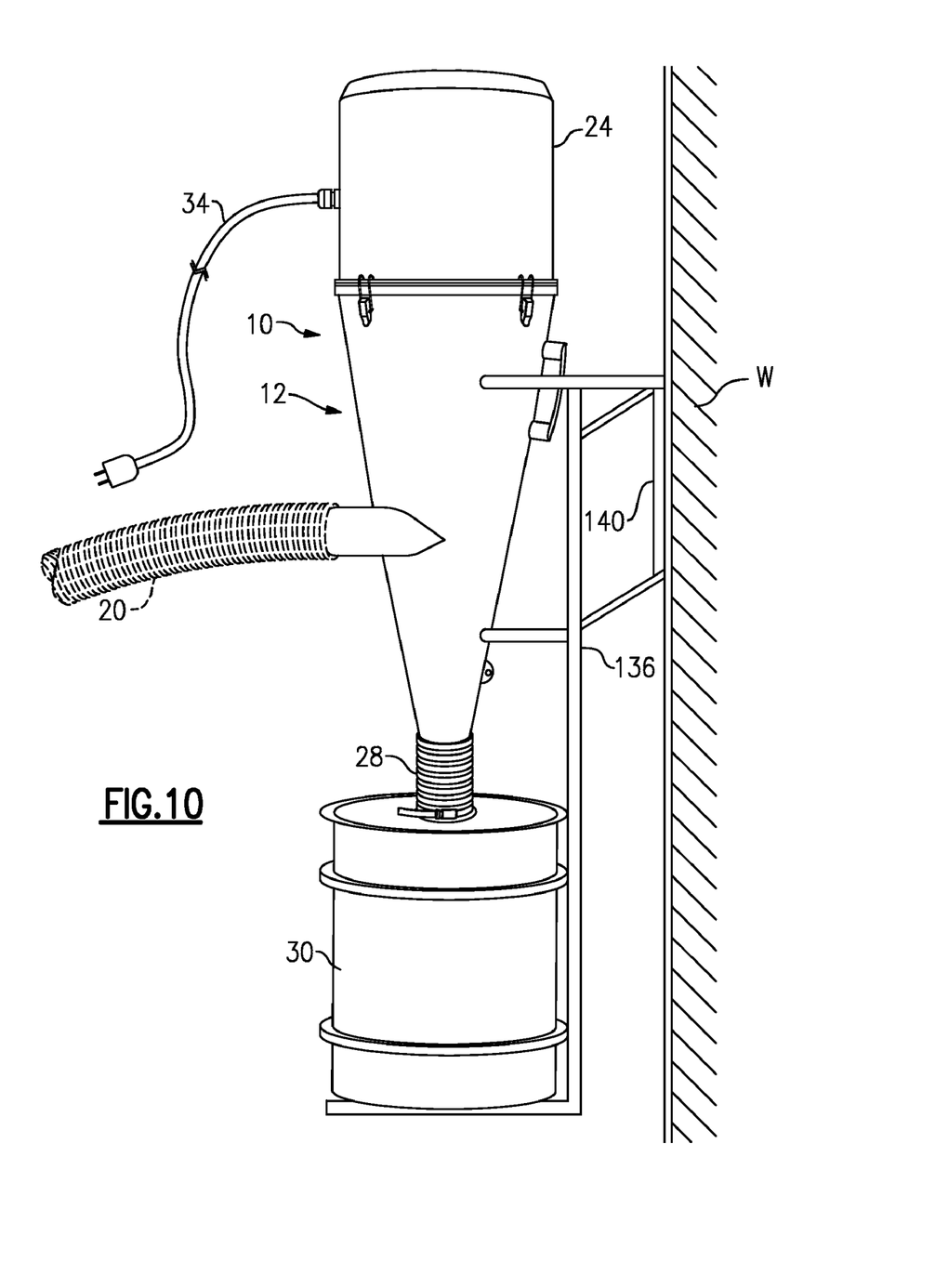
FIG. 10 illustrates an alternate, wall-mounted arrangement.

An alternative arrangement of the portable cyclonic vacuum cleaner 10 is shown in FIG. 10, here having a wall mounted carriage or frame 136 supporting the conic body 12 and dust collection drum or barrel 30, similarly to the carriage discussed previously, but here employing a wall mounting plate 140 as a component to the frame of the carriage, for attaching to a wall W or equivalent vertical surface. The boot 28, hose 20, and shroud 24 are also shown here.

In this preferred embodiment, vacuum has a performance capacity of about 280 CFM, and a maximum vacuum of 3.5 psi (corresponding to a water lift of 80 inches) with a power draw of 1800 watts, operating on line power of 110 VAC, drawing 12 amperes. The filter cartridge 60 can be a HEPA pleated cylindrical cartridge final filter, with a filtration effectiveness of 99.97% for particles 0.3 microns or above. The sound level generated by this embodiment can be as low as about 78 dBA, due to the muffling effect of the foam silencers 90 and 92. In the illustrated embodiment, the conic body 12 is about 25 inches in height, with a mouth diameter of about 12 inches to 16 inches. The drum has a diameter of about 15 inches, and a capacity of ten gallons. The shroud may be formed of an ABS material, for light weight and superior sound deadening. The entire vacuum system has a footprint of about 18 inches by 18 inches, or less, i.e., small enough to allow it to pass through most doorways, and fitting easily onto any van or truck for transport.

While the invention has been described hereinabove with reference to a few preferred embodiments, it should be apparent that the invention is not limited to such embodiments. Rather, many variations would be apparent to persons of skill in the art without departing from the scope and spirit of this invention, as defined in the appended Claims.

I claim:

1. A portable cyclonic vacuum cleaner, comprising;
   a conic body having a conic wall, and upper plate removably positioned at a wide upper end of said conic wall and closing off a said wide upper end of said conic wall, and a narrow nose at a lower end of the conic wall, said upper plate having an air passage therein;
   a divider plate affixed within said conic body at a level midway between said lower end and said upper end thereof, defining a cyclonic chamber at a lower part of the conic body between the divider plate and the nose of the conic body, and defining a filter chamber in an upper part of the conic body between the divider plate and said upper plate at the upper end of the conic body, the divider plate having a central passage, and a vortex tube descending from said central passage of said divider plate into the cyclonic chamber;
   an air inlet conduit penetrating said conic wall below said divider plate and adapted to introduce into said cyclonic chamber a flow of air in which dust particles are entrained, the air inlet conduit being adapted to attach to a flexible vacuum hose;
   a dust collection drum positioned below said nose and having a lid closing off a top of the dust collection drum, the lid having a dust inlet opening;

conduit means coupling the nose of the conic body to the inlet opening of the lid such that dust separated in the cyclonic chamber from said flow of air drops from said nose, through said conduit, into the dust collection drum, the conduit means forming a dust seal with said nose and said lid to block leakage of external air into the cyclonic chamber and said drum;

an air filter supported beneath said upper plate, the air filter covering said air passage of the upper plate and being suspended within said filter chamber, and adapted to filter air that enters the filter chamber from the central passage of said divider plate, before the air leaves through the air passage of said upper plate;

a vacuum blower positioned upon said upper plate and above said upper plate, and having an inlet opening that communicates with the filter chamber through the air passage of said upper plate; and frame means for positioning said conic body with respect to said dust collection drum and upon which said conic body is supported.

2. The cyclonic dust collection arrangement according to claim 1 wherein said air filter includes a cylindrical final filter cartridge.

3. The portable cyclonic vacuum cleaner according to claim 2 comprising means securing the final filter cartridge sealably against an under side of said upper plate and surrounding said air passage.

4. The portable cyclonic vacuum cleaner according to claim 1 wherein said conic body includes a planar mounting ring affixed at an inner periphery of the wide upper end of said conic wall, with said upper plate resting atop said mounting ring, and with an annular gasket laying upon said mounting plate between the mounting ring and a periphery of said upper plate.

5. The portable cyclonic vacuum cleaner according to claim 4, comprising a plurality of clamps disposed around the periphery of the wide upper end of said conic wall for releasably clamping said upper plate against the mounting ring with the gasket compressed therebetween.

6. The portable cyclonic vacuum cleaner according to claim 1 wherein said vacuum blower has a vertical rotary axis and the inlet conduit thereof is disposed on said rotary axis and extends onto the air passage of said upper plate to communicate therethrough with said filter chamber.

7. The portable cyclonic vacuum cleaner according to claim 1 wherein said divider plate is in the form of a shallow cone that slopes downward from the periphery towards the central passage thereof.

8. The portable cyclonic vacuum cleaner according to claim 1 comprising a shroud disposed atop said upper plate and defining an enclosed space within said shroud and above said upper plate that contains said vacuum blower, including vent openings to permit exhaust air from said blower to escape out from said enclosed space to the ambient.

9. The portable cyclonic vacuum cleaner according to claim 8 wherein said shroud includes a generally cylindrical housing, and a layer of a sound absorbent material disposed on an interior wall of the housing.

10. The portable cyclonic vacuum cleaner according to claim 1 wherein the frame of said carriage includes a horizontal base portion supporting said dust collection drum, a pair of generally vertical rails rising from said base member and extending along said conic body, each said rail having a respective strut extending towards said conic body, and a pair of brace members each associated with a respective one of said struts, and each being affixed at one end to an upper part of the conic body, and being attached to the respective one of said struts.

11. The portable cyclonic vacuum cleaner according to claim 1 wherein said conduit means includes a flexible tubular collar having a lower portion supported on the lid of said dust barrel, and an upper end fitted onto the nose of said conic body.

12. The portable cyclonic vacuum cleaner according to claim 1 comprising a reverse air pulse feature including an opening in said upper plate, a plug member removably seated upon said opening for normally blocking passage of air through said opening, biasing means for urging said plug member into a seated condition on the opening of the upper plate, a handle disposed outside said conic body, and linkage means connecting said handle to said plug member for manually unseating the plug member from the opening, whereupon when the handle is released the biasing means returns the plug member back to said opening.

13. The portable cyclonic vacuum cleaner according to claim 12 wherein said divider plate is in the form of a shallow cone that slopes downward from the periphery towards the central passage thereof to facilitate passage of dust, loosened from said air filter by means of said reverse air pulse feature, downward into the dust collection drum.

14. The portable cyclonic vacuum cleaner according to claim 1, further comprising a plurality of wheel members disposed beneath said dust collection drum.

15. The portable cyclonic vacuum cleaner according to claim 1, further comprising means for mounting the frame means onto a vertical surface.

\* \* \* \* \*

UNITED STATES PATENT AND TRADEMARK OFFICE
CERTIFICATE OF CORRECTION

PATENT NO. : 8,393,050 B2
APPLICATION NO. : 12/607122
DATED : March 12, 2013
INVENTOR(S) : Robert M. Witter Page 1 of 1

It is certified that error appears in the above-identified patent and that said Letters Patent is hereby corrected as shown below:

In the Claims, Col. 8, Claim 1, line 47:

"off a said" should read --off said--.

Signed and Sealed this
Seventh Day of May, 2013

Teresa Stanek Rea
*Acting Director of the United States Patent and Trademark Office*